(12) United States Patent
Kayahara et al.

(10) Patent No.: US 7,734,491 B2
(45) Date of Patent: Jun. 8, 2010

(54) HIERARCHICAL PROJECTS IN A COMPUTER-ENABLED PROJECT MANAGEMENT METHOD AND SYSTEM

(75) Inventors: Roy Kayahara, Sammamish, WA (US); Raju Iyer, Redmond, WA (US); Nichol C. Viton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 10/868,661

(22) Filed: Jun. 15, 2004

(65) Prior Publication Data

US 2005/0278209 A1    Dec. 15, 2005

(51) Int. Cl.
G05B 19/418    (2006.01)
(52) U.S. Cl. ......................................................... 705/8
(58) Field of Classification Search ...................... 705/8
See application file for complete search history.

(56) References Cited

U.S. PATENT DOCUMENTS

| | | | | |
|---|---|---|---|---|
| 5,381,332 | A * | 1/1995 | Wood | 705/8 |
| 5,548,506 | A | 8/1996 | Srinivasan | 364/401 |
| 5,765,140 | A * | 6/1998 | Knudson et al. | 705/9 |
| 6,101,481 | A * | 8/2000 | Miller | 705/9 |
| 6,351,734 | B1 * | 2/2002 | Lautzenheiser et al. | 705/8 |
| 6,581,040 | B1 * | 6/2003 | Wright et al. | 705/8 |
| 6,609,100 | B2 * | 8/2003 | Smith et al. | 705/8 |
| 6,714,829 | B1 | 3/2004 | Wong | 700/101 |
| 7,096,222 | B2 * | 8/2006 | Kern et al. | 707/100 |
| 7,139,719 | B1 | 11/2006 | Cherneff et al. | 705/36 |
| 7,349,863 | B1 * | 3/2008 | Pena-Mora et al. | 705/8 |
| 7,406,432 | B1 * | 7/2008 | Motoyama | 705/7 |
| 2003/0233303 | A1 | 12/2003 | Elazouni | 705/36 |
| 2004/0153354 | A1 | 8/2004 | Nonaka et al. | 705/8 |

FOREIGN PATENT DOCUMENTS

WO    WO 02/099637 A1 * 12/2002

OTHER PUBLICATIONS

ActiveProject Brochure Framework Technologies, Inc. 2000.*
Framework Technologies Tackles Schedule Communication Problem with Latest Release of ActiveProject PR Newswire, Aug. 7, 2000.*
Kumar, Ashish, Managing Changes In Large Programs 2000 AACE International Transactions, 2000, CSC.04.01.*
Maurer, Frank et al., Merging Project Planning and Web-Enbaled Dynamic Workflow Technologies IEEE Internet Computer, May-Jun. 2000.*
Goldman, Sigrid et al., MILOS: A Model of Interleaved Planning, Scheduling and Enactment Web-Proceedings of the 2nd Workshop on Software Engineering, 1999.*

(Continued)

*Primary Examiner*—Scott L Jarrett
(74) *Attorney, Agent, or Firm*—Merchant & Gould; Ryan T. Grace

(57) ABSTRACT

Methods and systems are provided for establishing a hierarchical relationship between a parent or master project schedule and sub-project schedules including tasks and phases required for completion of the parent or master project. When changes are made to data contained in a given parent or master project schedule or to a hierarchically related sub-project schedule, an automatic notification is passed to the owners/managers of affected project schedules so that those parties may accept the proposed change, reject the proposed change, or respond to the submitting party with a counter change proposal.

15 Claims, 4 Drawing Sheets

OTHER PUBLICATIONS

Pyron, Tim et al., Special Edition Using Microsoft Project 2000 Que, 2000, ISBN: 0-7897-2253-9.*

Slpos, Andrew, Multiproject Scheduling Cost Engineering, vol. 32, No. 11, Nov. 1990.*

Pyron, Tim, Special Edition Using Microsoft Project 2002 Que, 2002, ISBN: 0-7897-2701-3.*

Framework Technologies Releases ActiveProject Version 3.0 AECNews.com, Jul. 1, 1998.*

Petrie, Charles et al., Agent-Based Project Management International Workshop on Intelligent Agents in CSCW, 1998.*

Stover, Teresa, Microsoft Office Project 2003 Inside Out Microsoft Press, 2003, ISBN: 0-7356-1958-1.*

Bilstein, Todd, Managing Schedule Changes at Rocky Flats AACE International Transactions, 1999.*

FrameTech.com Web Pages Framework Technologies, 2001-2002, Retreived from Archive.org Feb. 24, 2009.*

Bilsten, Todd, Managing Schedule Changes at Rocky Flats AACE International Transactions, 1999.*

Kumar, Ashish, Managing Changes in Large Programs 2000 AACE International Transactions, 2000, CSC 04.01.*

U.S. Appl. No. 10/868,517, filed Jun. 15, 2004, entitled "Method and System for Restarting a Project Management System Scheduling Engine Based on User Input of Contractual Start/Finish Data".

Frank Maurer et al., "Merging Project Planning and Web-Enabled Dynamic Workflow Technologies", IEEE Internet Computing, http://computer.org/internet/, May & Jun. 2000, pp. 65-74.

Sigrid Goldmann et al., "Procura: A Project Management Model of Concurrent Planning and Design", IEEE Proceedings of WET ICE '96, Jun. 1996, pp. 177-183.

Georg Angermeier, "Cooperative Project Management with RPLAN", Projekt Magazin, http://www.projektmagazin.de, May 2002, pp. 1-6.

Buchbinder et al., "Oracle Project Management", Oracle, User Guide Release 11$i$ Part No. B10895-02.

U.S. Official Action in U.S. Appl. No. 10/868,571 mailed Nov. 18, 2009.

* cited by examiner

HIERARCHICAL PROJECTS IN A COMPUTER-ENABLED PROJECT MANAGEMENT METHOD AND SYSTEM

FIELD OF THE INVENTION

The present invention generally relates to project management methods and systems. More particularly, the present invention relates to hierarchically related projects in a project management method and system.

BACKGROUND OF THE INVENTION

With the advent of the computer age, computer and software users have grown accustomed to user-friendly software applications that help them write, calculate, organize, prepare presentations, send and receive electronic mail, make music, and the like. Modern word processing applications, for example, allow users to create and edit a variety of useful documents. Modern project management applications, for another example, allow users to create project schedules for organizing and managing tasks, resources and the labor associated with a variety of projects.

Manual and computerized project management systems allow managers and planners to organize and schedule the tasks, resources and timing required for completion of a given project. In most projects, a number of dependencies and constraints dictate the timing and completion of an overall project and of sub-projects contained in the overall project. For example, in a house construction project, a drywall project may not typically begin until the completion of electrical work. And, a number of sub-projects may be constrained by the availability of labor and resources. Project management software applications have been developed, for creating and automating project schedules. With many such systems, tasks or sub-projects within an overall project are set out showing start dates, completion dates and information regarding utilized resources or constraints thereon.

Prior project management schedules typically may be edited by any person having edit permissions, and changes made to a given schedule are automatically made throughout the schedule without warning to other affected parties. For example, following the example construction project set out above, if an electrician makes changes to his/her portion of a house construction project schedule, a drywall professional's schedule may be automatically changed without notice to the drywall professional. Some systems have been developed to allow the owner/manager of a sub-project within an overall project to independently manage the sub-project schedule, but because the performance of the sub-project may serve as a constraint on the performance of the overall project, changes to the sub-project schedule nonetheless cause changes to the overall project and to other sub-projects comprising the overall project. Because of these types of problems, the project schedule is often reduced to a mere snapshot view of the project schedule which must be closely monitored by all project participants due to the nature of such automated changes and to the lack of automated notification of changes to the project participants.

Accordingly, there is a need for improved project management methods and systems that allow for independent management of sub-projects, and that allow for notification and change acceptance to and from project participants. It is with respect to these and other considerations that the present invention has been made.

SUMMARY OF THE INVENTION

Embodiments of the present invention solve the above and other problems by providing an improved automated project management method and system wherein sub-projects of an overall project are related hierarchically to the overall project and to other sub-projects (if required), and wherein changes made to one or more sub-projects or to the overall project are persisted in the overall project and to the affected sub-projects through notification and acceptance/rejection/counter change to and from the affected project/sub-project owners/managers.

According to an aspect of the invention, a hierarchical relationship is established between a set of projects comprising an overall project wherein the overall project has a parent/child relationship to sub-projects comprising the overall project, and whereby a given sub-project may have a parent/child relationship with sub-projects comprising the given sub-project. Target dates for completion of sub-projects and included tasks are passed from the parent project down to child sub-projects comprising the parent project. Independently manageable child sub-project schedules are constructed and are passed back to the parent project for construction of a parent project schedule.

If a change in the parent schedule is made that affects one or more child sub-projects, a notification is sent to the owner/manager of each affected child sub-project. Upon receipt of the change from the parent project, an affected child sub-project may accept the change, and the child sub-project is automatically updated to reflect the accepted change. Alternatively, if the owner/manager of an affected child sub-project finds the change from the parent project unacceptable, a counter change may be proposed from the child sub-project back to the parent project. Upon notification of the counter change from the child sub-project, the parent project owner/manager may accept or reject the counter change.

If the parent project rejects the counter change, the submitting child sub-project is notified, and the original change passed to the child sub-project schedule from the parent project schedule is automatically accepted by the child sub-project schedule, and any changes to the child sub-project schedule required by the change are made. If the parent project schedule accepts the counter change, a notification of the counter change is passed to all affected child sub-projects by the parent project schedule for acceptance by receiving child sub-projects wherefore further counter change from receiving child sub-projects.

If a given child sub-project owner/manager submits a proposed change to the parent project schedule, the parent project owner/manager may accept or reject the proposed change. If the parent project accepts the proposed change, then a notification is sent to all affected child sub-project owners/managers who may accept or propose counter changes.

According to another aspect of the invention, each child sub-project schedule may be managed and changed independently from the parent project schedule or other child sub-project schedules, but changes made to individual child sub-project schedules are only made to the parent project schedule and to other child sub-project schedules through the notification/acceptance/rejection/counter change process described above. Given proper access permissions, the owner/manager of the parent project schedule or owners/managers of other child sub-project schedules may access and view other child sub-project schedules to review changes or variances made to project schedules.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENTS

Figure 1:
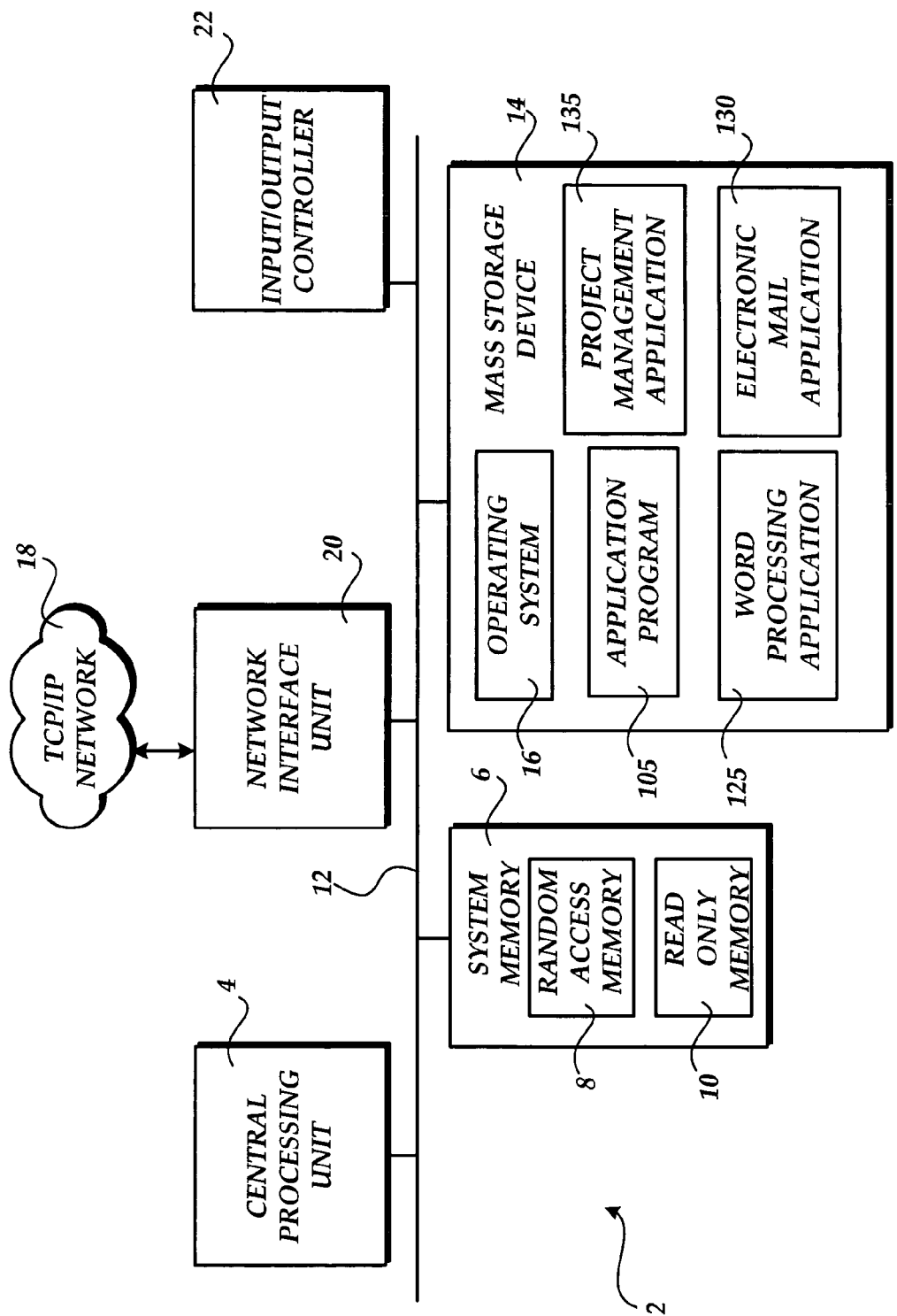
FIG. 1 illustrates an exemplary computing operating environment for embodiments of the present invention.

As briefly described above, embodiments of the present invention are directed to improved automated project management methods and systems wherein sub-projects of an overall project are related hierarchically to the overall project and wherein changes made to one or more sub-projects or to the overall project are persisted in the overall project and to the sub-projects through a notification and acceptance/rejection/counter change process between a parent project of the overall project and affected child sub-projects of the parent project. When a change made in a child sub-project is submitted for acceptance by the parent project, a notification is sent to the owner/manager of the parent project who may accept or reject the proposed change. If the proposed change is accepted, the parent project owner/manager submits the change to all affected child sub-projects along with a notification to the owners/managers of the child sub-projects. The owners/managers of the child sub-projects may accept the change or may propose a counter change back to the parent project. Individual child sub-projects may be managed independently from the overall project, but changes made to individual child sub-project schedules are made to the overall project only after the notification and acceptance/rejection/counter change process described herein.

By separating the overall project into independently manageable sub-project schedules, the owners/managers of the sub-project schedules comprising an overall parent or master project schedule may manage their own respective schedules without automatically making changes without warning to the overall project schedule each time an owner/manager affects changes in his or her respective sub-project schedule. For example, if the owner/manager of a given sub-project schedule realizes that a given task or sub-task may require an extra week to complete, the owner/manager of the sub-project schedule may make changes to his/her sub-project schedule without submitting those changes to any affected upstream parent project schedule or affected downstream sub-project schedule if the owner/manager of the changed sub-project schedule knows that the sub-project will be completed on the original schedule notwithstanding the change made to some discrete portion of the sub-project schedule. For example, the owner/manager of the sub-project may know that additional labor or resources will be utilized to ultimately cause the sub-project to be completed on the original schedule notwithstanding the change made to a given task or phase contained in the sub-project schedule. Thus, the owner/manager of the affected sub-project schedule may independently manage his/her sub-project without automatically making changes to a published overall project schedule.

On the other hand, if the owner/manager of the affected sub-project schedule realizes that the change in his/her schedule may not be overcome, the change may be submitted upstream to a parent project schedule owner/manager or to downstream sub-project schedule owners/managers for acceptance, rejection, or counter change, as described herein. Thus, embodiments of the present invention allow for owners/managers of individual project schedules to independently manage their own respective project schedules apart from other project schedules or sub-project schedules to which their project schedule is related. Only when the owner/manager of a given project schedule desires to submit a scheduled change upstream to a parent project schedule or downstream to one or more sub-project schedules does the automatic notification method and system described herein operate.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, an electronic mail application 130, a database application and the like. According to embodiments of the present invention, a project management application 135 is included for preparing project schedules as described herein. An example project management application for use in accordance with the present invention is PROJECT manufactured by Microsoft Corporation.

Figure 2:
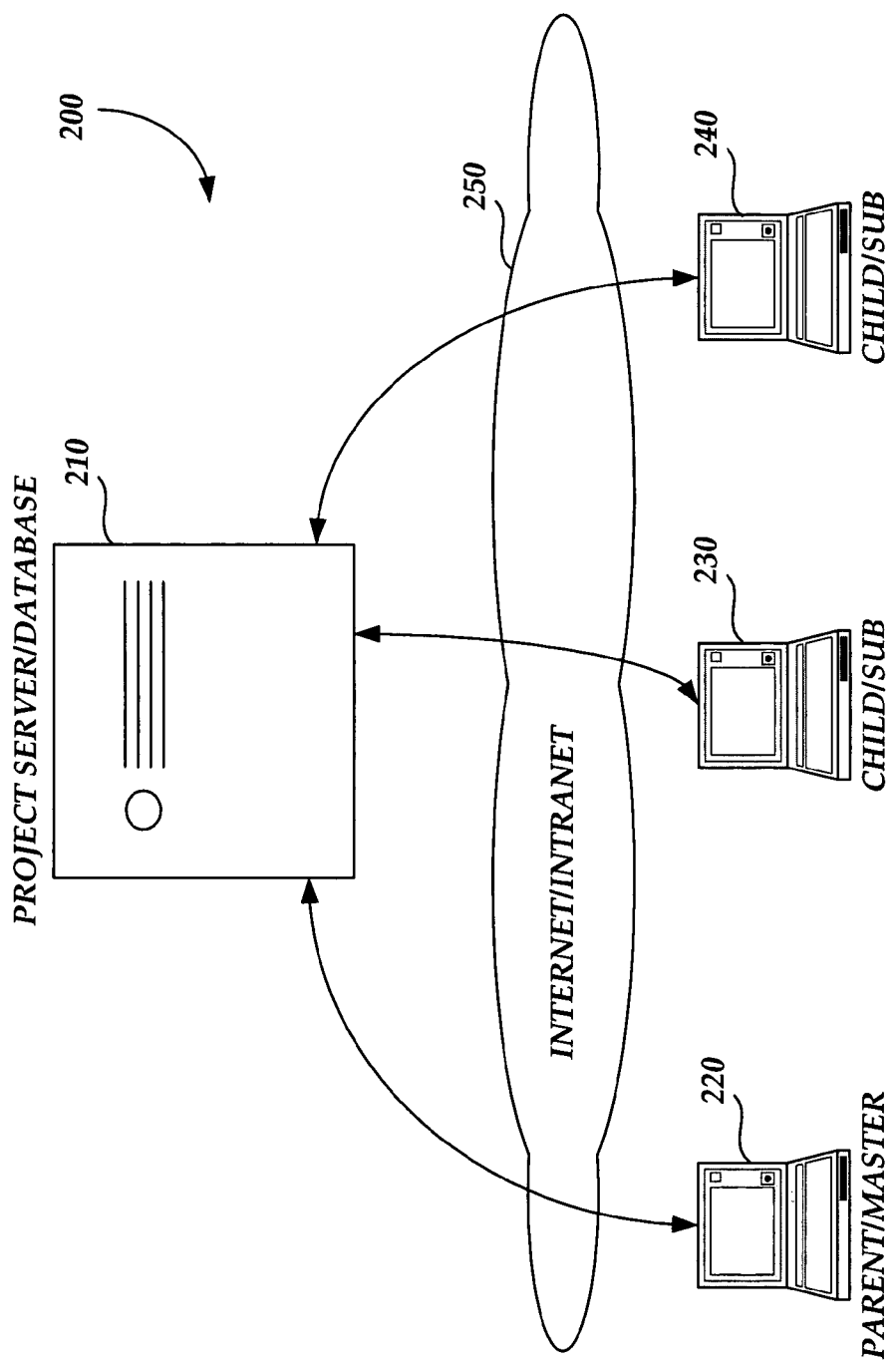
FIG. 2 is a simplified block diagram of a distributed computing environment through which the owners/managers of a parent project and one or more child sub-projects may communicate to a project server/database for creation and maintenance of a project schedule according to embodiments of the present invention.

FIG. 2 is a simplified block diagram of a distributed computing environment through which the owners/managers of a parent project and one or more child sub-projects may communicate to a project server/database for creation and maintenance of a project schedule according to embodiments of the present invention. The distributed computing environment 200 illustrated in FIG. 2 serves as an exemplary operating environment for embodiments of the present invention. As described herein, an overall project schedule may be comprised of a parent project schedule and one or more hierarchically related child sub-projects.

According to embodiments of the present invention, the overall or parent project schedule and individual and independently manageable child sub-project schedules are maintained on a project server/database 210. The project server/database 210 is a general purpose computing system having components including an operating system, a processor and memory space as described above for the computer 2 illustrated and described with reference to FIG. 1. The project server/database 210 also includes a project management application 135 having sufficient computer executable instructions for constructing, displaying and allowing management of the overall/parent project schedule and of the individual child sub-project schedules described herein.

The project server/database 210 also includes a relational database for maintaining data associated with the parent project schedule and for each of the individual child sub-project schedules. As should be understood by those skilled in the art, the relational database allows for information stored associated with one project schedule to be related to one or more other project schedules for exchanging stored data between disparate project schedules comprising the overall or parent project schedule described herein.

As illustrated in FIG. 2, the parent/master computer system 220 is illustrated for communication with the project server/database 210 via a distributed computing system such as the Internet or intranet 250. One or more child/sub-project computing systems 230, 240 are illustrated for communicating with the project server/database 210 via the Internet or intranet 250. As should be appreciated, the computing systems 220, 230, 240 operated by the owners/managers of the parent project schedule and of one or more child sub-project schedules comprising the parent project schedule may include the processing and memory functionality described above with reference to the computer 2, illustrated in FIG. 1. Each of the individual computing systems 220, 230, 240 may also include a project management application 135 described above with reference to FIG. 1, and serving as client-side project management applications to a corresponding project management application 135 operated at the project server/database 210. According to embodiments of the present invention, the project server/database 210 may also include or may be operative to access an electronic mail application 130 for sending automatic project schedule changes to and from owners/managers of the parent project schedule and the child sub-project schedules.

According to embodiments of the present invention, the owner/manager of the parent project schedule may create the project schedule from the computing system 220 via the Internet or intranet 250 to the project server/database 210. Creation and maintenance of individual child sub-project schedules may likewise be created by owners/managers of the child sub-project schedules from the computing systems 230, 240 via the Internet/intranet 250 to the project server/database 210. Notifications between the owners/managers of the parent project schedule and the one or more child sub-project schedules may be affected automatically by a communications application such as the electronic mail application 130 upon command by the project management application 135. That is, when a change or proposed change requires notification to the owner/manager of an affected project schedule or related sub-project schedule, the project management application 135 at the project server/database 210 may call a communications application such as the electronic mail application 130 and cause an appropriate notification message to be sent to the affected party. As should be understood by those skilled in the art, other forms of communication may be utilized for notification of affected parties including instant messaging systems, telephonic systems, and the like.

As is appreciated by those skilled in the art of project management methods and systems, a given project may include a number of tasks that must be completed and each task may be constrained by available resources and a required duration of time for completion of the task. Moreover, some tasks may not be initiated until the completion of a related task. For many projects, individual tasks comprising a given project are managed and processed under a separate and related project schedule. For example, a master project schedule may be prepared for constructing a house. The master project schedule may include three phases or tasks such as general framing, electrical and plumbing. Each of the phases or tasks of the master project may be completed by a subcontractor who constructs and manages his/her own project schedule for a given phase or task. For example, a first sub-project schedule may be constructed for general framing, a second sub-project schedule may be constructed for electrical work, and a third project schedule may be constructed for plumbing work. As should be appreciated, each of the sub-project schedules may be broken into one or more phases or tasks which may, in turn, be associated with additional sub-projects for completion of one or more tasks within a given sub-project.

Figure 3:
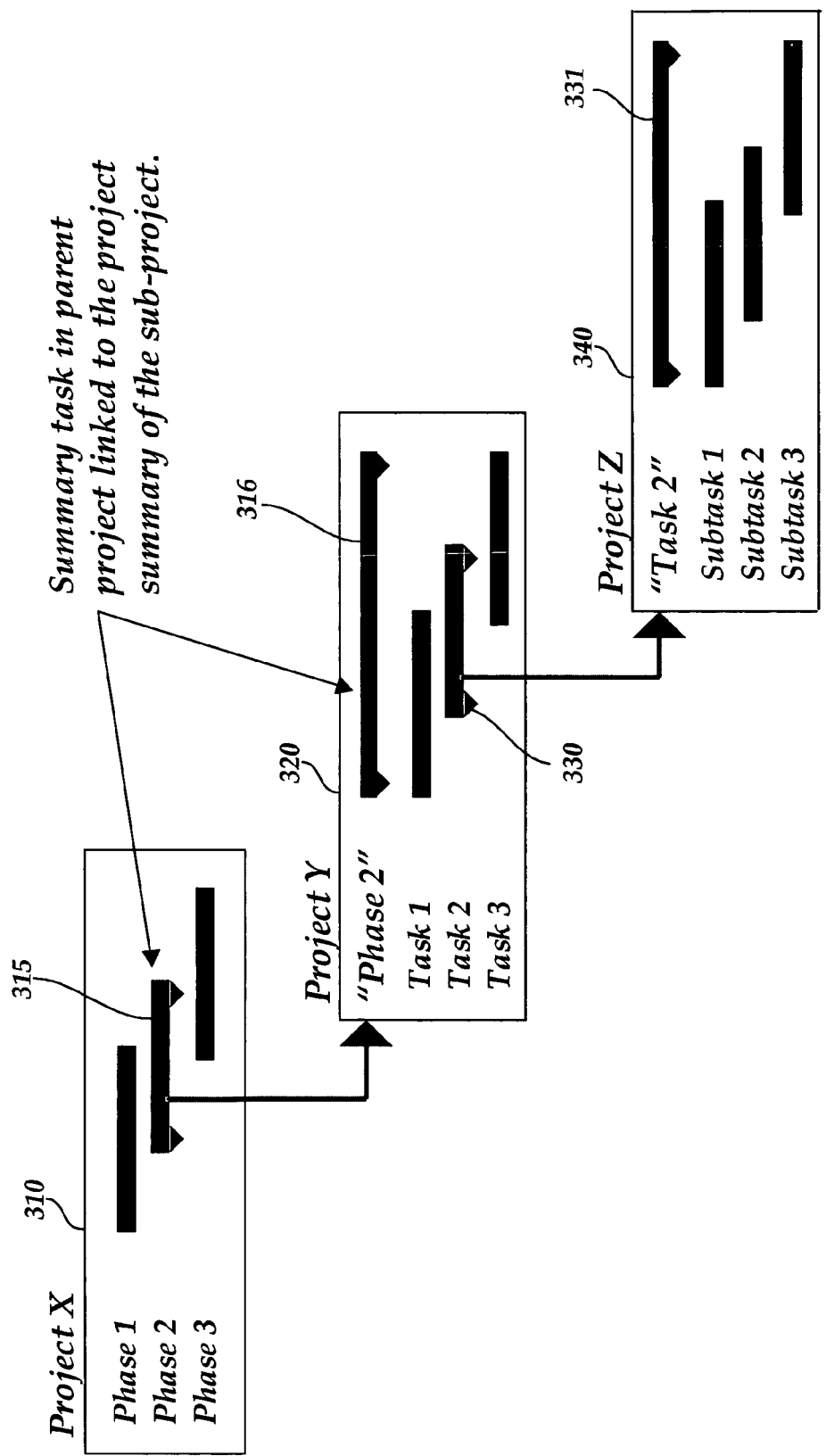
FIG. 3 are simplified block diagrams illustrating hierarchical relationships between parent and child sub-projects in an overall project schedule according to embodiments of the present invention.

According to embodiments of the present invention, a hierarchical relationship is established between related projects and associated sub-projects in a parent/child hierarchical relationship so that changes or proposed changes in any related schedule may be accepted, rejected, or otherwise responded to through a notification process as described herein. Referring now to FIG. 3, hierarchically related project schedules related to each other in association with an overall project and stored at the project management server/database 210 are illustrated. The overall project schedule 310 is illustrated as having three project phases that must be completed in order to complete the overall project. For example, the project schedule 310 may be a project schedule for constructing a house, described above. Phase 1 may include general framing, Phase 2 may include electric work, and Phase 3 may include plumbing work.

Once the owner/manager of the project schedule 310 establishes target dates for beginning and completing each of the phases of the project schedule 310, those target dates are passed down to owners/managers of required sub-projects for completing each phase of the master project schedule 310. For each of the sub-projects, a sub-project schedule may be constructed for managing and scheduling tasks required for completing the given sub-project. For example, the project schedule 310 may be illustrative of a sub-project schedule required for completing Phase 2 of the overall project schedule 310. Similarly, the project schedule 340 may include scheduling information required for completion of Task 2 of the project schedule 320. As illustrated in FIG. 3, the three project schedules are hierarchically related such that the master project schedule 310 serves as a parent schedule, the sub-project schedule 320 serves as a child schedule to the parent schedule 310, and the sub-project schedule 340 serves as a child sub-project schedule to the sub-project schedule 320.

In each of the illustrated project schedules 310, 320, 340, summary tasks are illustrated for grouping together one or more sub-tasks required for completion of a given task. For example, the Phase 2 summary task 315 illustrated in the parent project schedule 310 includes summary information related to all tasks, resources, constraints, and timing associated with completing Phase 2 of the parent project. The sub-project schedule 320 shows the summary task 316 that is linked to the summary task (Phase 2) 315 in the parent schedule 310. As should be appreciated, the summary task 316 illustrated in 320 contains summary information related to any tasks that must be completed for the completion of the Phase 2 summary task 316. Likewise, a Task 2 summary task 331 is illustrated in the sub-project schedule 340 that is linked to the Task 2 schedule set out in the sub-project schedule 320.

As is well known to those skilled in the art, in a given project schedule, as illustrated in FIG. 3, certain tasks or phases of a project may not be initiated until the completion of another phase or task. For example, Phase 2 illustrated in the master/parent project schedule 310 may not be initiated until completion of Phase 1. Similarly, Task 3 of the sub-project schedule 320 may not be initiated until completion of Task 1 of the project schedule 320. Consequently, if Phase 1 of the parent/master project schedule 310 is extended, the initiation of Phase 2 may be pushed out to a later start date. Changing the start date of Phase 2 may necessarily cause the start dates of the tasks comprising Phase 2 to be similarly pushed out to a future date. As a result, the tasks scheduled as a part of the sub-project schedule 340 may likewise be pushed out to future dates as a result of the change in the parent/master schedule 310. Similarly, a change made in the scheduling of a sub-task in the sub-project schedule 340 may cause a disruption in the schedule of a phase or task scheduled in an upstream sub-project schedule or parent/master project schedule.

If such schedule changes are automatically made to each of the associated project schedules without warning to the owners/managers of the associated project schedules, the resulting project schedules become less reliable to their respective owners/managers and, at best, serve as snapshots of the presently amended project and sub-project schedules. According to embodiments of the present invention, the establishment of a parent/child hierarchical relationship between the master project schedule and any associated child sub-project schedules allows for an automated notification and acceptance/rejection/counter change process to occur between owners/managers of various related project schedules so that each of the project schedules may be more informative and manageable by their respective owners/managers.

Figure 4:
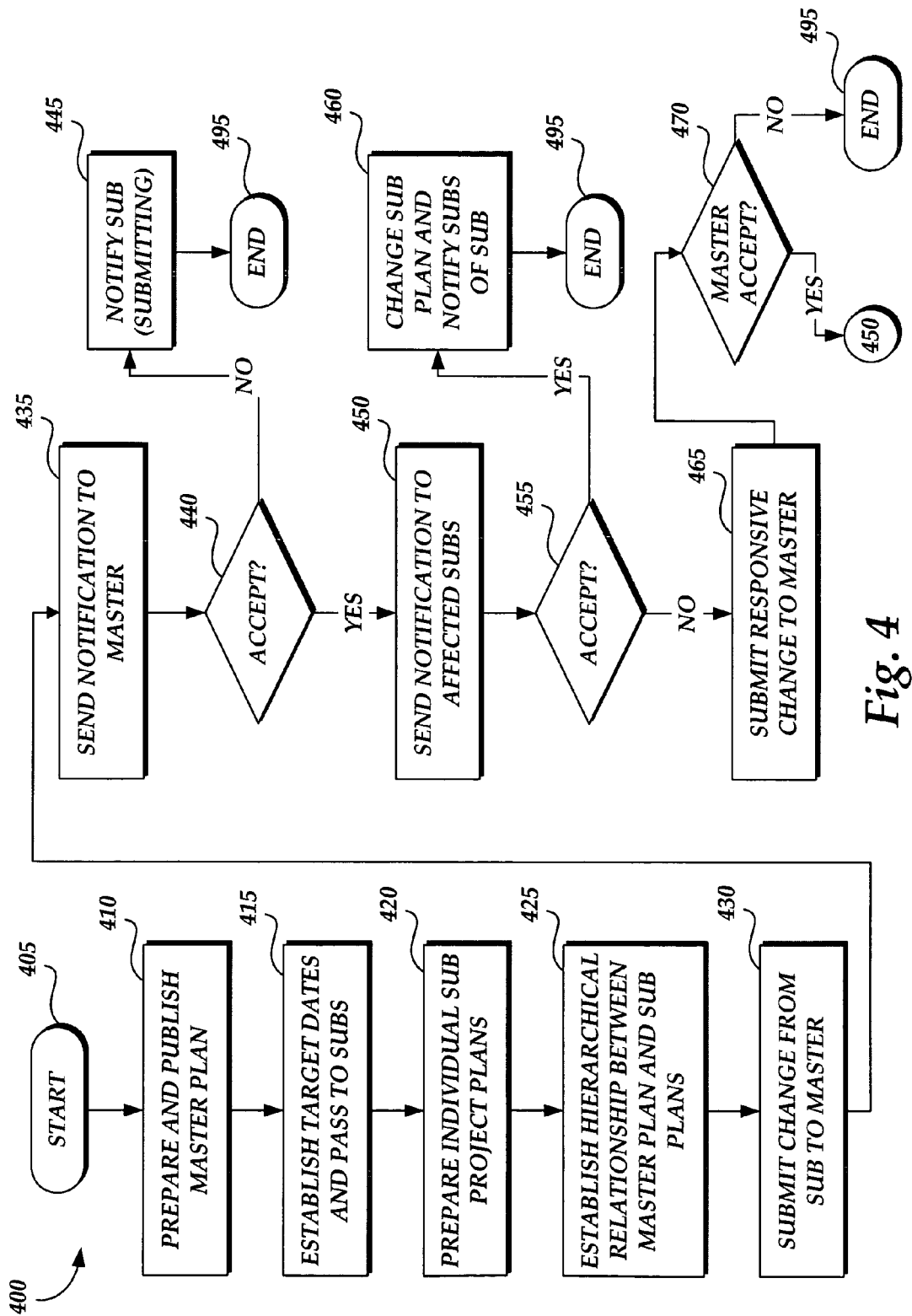
FIG. 4 is a flow diagram showing an illustrative routine for creating and managing parent and hierarchically related child sub-projects according to embodiments of the present invention.

Having described an exemplary operating environment for embodiments of the present invention with reference to FIGS. 1 and 2 and having described hierarchically-related project schedules with reference to FIG. 3, FIG. 4 is a flow diagram showing an illustrative routine for creating and managing a project schedule comprised of a parent (master) project schedule and one or more hierarchically-related sub-project schedules. The routine 400 begins at start block 405 and proceeds to block 410 where an owner/manager of a master project prepares and publishes a master/parent project schedule such as the parent project schedule 310 illustrated in FIG.

3. As described above with reference to FIG. 2, the owner/manager of the master project may prepare the master project schedule 310 using the computing system 220, and the master project schedule 310 may be published to and stored at the project management server/database 210 via the distributed computing environment 200.

At block 415, target dates for initiation and completion of individual phases or tasks comprising the master project schedule are established and are passed to owners/managers of sub-projects required for completing the one or more phases or tasks comprising the master project. At block 420, the owners/managers of the one or more sub-projects create individual sub-project schedules 320, 340, illustrated in FIG. 3, required for completing phases and tasks required by each sub-project for ultimately completing the master project. Once the individual sub-project schedules are prepared, those project schedules are published to the project management server/database 210, as described above with reference to FIG. 2.

At block 425, a hierarchical relationship is established at the project management server/database 210 between the master project schedule 310 and the associated sub-project schedules 320, 340. As described above with reference to FIG. 2, the project management server/database 210 includes a relational database that may be utilized in accordance with embodiments of the present invention for relating phases or tasks of one project schedule with associated phases or tasks of a hierarchically-related parent project schedule or sub-project schedule. According to embodiments of the present invention, changes affected to data in a first project schedule that is related to data contained in a second project schedule does not automatically effect changes to the related data contained in the second project schedule.

Instead, according to embodiments of the present invention, changes to data in the first project schedule cause a notification to be sent to the owner/manager of the second project schedule to allow the owner/manager of the second project schedule to accept the change, reject the change, or propose a different change. Thus, changes made to data in the first project schedule do not automatically affect changes to data in the second project schedule without warning to the owner/manager of the second project schedule. For example, consider that a master project schedule includes three phases associated with the construction of a house where Phase 1 includes general framing, Phase 2 includes electrical work, and Phase 3 includes plumbing work. Consider that a first sub-project schedule 320 includes scheduling data associated with three tasks required for completion of Phase 2 in the master project schedule (electrical work). Consider further that a second sub-project schedule 340 includes three sub-tasks associated with completion of Task 2 of the first sub-project schedule, for example, three sub-tasks associated with completion of a portion of the electrical work.

Establishment of a hierarchical relationship between the three example project schedules includes establishment of the first sub-project schedule 320 as having a child relationship with the parent project schedule 310 and establishment of the second sub-project schedule 340 as having a child relationship with the first sub-project schedule 320. According to embodiments of the present invention, if the owner/manager of the parent project schedule 310 increases or decreases the duration of time associated with Phase 2 of the parent project schedule 310, a notification is automatically sent to the owner/manager of the first sub-project schedule 320 because data associated with the first project schedule 320 is related to data representing the amended Phase 2 schedule in the parent project schedule 310. If a change is made to data contained in the first sub-project schedule 320 because of the change submitted from the parent project schedule 310 that affects related data contained in the second sub-project schedule 340, a notification will likewise be sent to the owner/manager of the second sub-project schedule 340.

Scheduling changes submitted from a parent project schedule or sub-project schedule to a sub-project schedule having a child relationship with the submitting project schedule may be accepted by the receiving sub-project owner/manager, or a counterproposal may be submitted back up the hierarchical structure to the submitting parent project or sub-project. If a change received by a sub-project owner/manager is accepted, the change is automatically made to data contained in the receiving and accepting sub-project schedule. If a counter change is submitted by the receiving sub-project schedule owner/manager, the receiving parent project schedule owner/manager may accept the counter change, reject the counter change, or submit yet another counter change back down to the submitting sub-project management owner/manager. Once any change is accepted by a given project schedule owner/manager, as described herein, then a notification is automatically sent to any downstream sub-project schedule whose data is related to data in the changed project schedule and which is affected by the change.

Continuing with the description of the routine 400 illustrated in FIG. 4, at block 430, a change is submitted by the owner/manager of the given sub-project schedule 320 up to the owner/manager of a parent project schedule 310. For example, considering the example described above, the owner/manager of a first sub-project schedule 320 may submit a change requiring that the electrical work for a house construction project is to be extended by one week past the originally established target date. At block 435, because data changed in the first sub-project schedule 320 is related to data contained in the parent project schedule 310 rather than automatically changing related data in the parent project schedule 310, a notification is submitted to the owner/manager of the parent project schedule 310 to alert the owner/manager of the change submitted by the first sub-project schedule 320 owner/manager. As should be understood by those skilled in the art, notification sent to parent project schedule owner/manager may be automatically forwarded via an electronic mail application 130, or the notification may be submitted to the owner/manager of the parent project schedule 310 through any other suitable notification means including instant messaging, telephonic notification, and the like.

At block 440, a determination is made as to whether the owner/manager of the parent project schedule 310 accepts the change made by the owner/manager of the first sub-project schedule 320. According to an embodiment of the present invention, the owner/manager of the master project schedule 310 may be presented with a preview of what the master project schedule 310 and any related sub-project schedules will look like if the proposed change is accepted by the owner/manager of the master project schedule 310. If the owner/manager of the parent project schedule 310 does not accept the change, the routine proceeds to block 445, and the submitting sub-project schedule owner/manager is notified that the parent project schedule owner/manager does not accept the submitted change. As described above, the owner/manager of the parent project schedule 310 may submit a counter change back to the originally submitting sub-project owner/manager, or the parent project schedule owner/manager may simply reject the proposed change. Returning back to block 440, if the owner/manager of the parent project schedule 310 does accept the change from the sub-project schedule owner/manager, the change is persisted in the submitting first sub-project schedule, and the change is automatically made in the accepting parent project schedule 310.

At block 450, a notification is then sent to any additional sub-project schedule owner/managers whose data will be affected by the accepted change. For example, if the change made and accepted to data contained in the first sub-project schedule 320 is related to data contained in a second sub-project schedule 340 having a child relationship to the first sub-project schedule 320, a notification is then sent to the owner/manager of the second sub-project schedule 340 regarding a change in the data. For example, the accepted and persisted change to the data in the first sub-project schedule 320 may cause the initiation of a sub task contained in the second sub-project schedule 340 to be pushed out by two weeks.

At block 455, a determination is made as to whether the notified sub-project schedule owner/manager accepts the change required by the change in the upstream project schedules, described above. If the first notified sub-project schedule owner/manager accepts the changes caused to his/her schedule, the routine proceeds to block 460, and the sub-project schedule is changed, and required notification to additional downstream sub-project schedule owners/managers is made, as described herein. If the receiving sub-project schedule owner/manager does not accept the change caused by the upstream changes, the routine proceeds to block 465, and a responsive counter change may be submitted back up to upstream project schedule or sub-project schedule owners/managers. For example, if initiation of a particular sub task of the second sub-project schedule 340 must be pushed out two weeks because of a change affected to the first sub-project schedule 320 and accepted by the owner/manager of the parent project schedule 310, the owner/manager of the second sub-project schedule 340 may submit a counter change proposing that the initiation of the affected sub-task be pushed out three weeks instead of two weeks. At block 470, a determination is made as to whether the parent or master project schedule or sub-project schedule owner/manager accepts the proposed counter change by the owner/manager of the second sub-project schedule 340. If the owner/manager of the receiving master/parent project schedule accepts the counter change proposed by the owner/manager of the second sub-project schedule 340, the routine proceeds back to block 450 for notification to other affected sub-project schedule owners/managers.

As described herein, a method and system are provided for establishing a hierarchical relationship and communications between a parent or master project schedule and sub-project schedules including tasks and phases required for completion of the parent or master project. It will be apparent to those skilled in the art that various

We claim:

1. A system for communicating scheduling changes in a project management schedule, the system comprising:
a processor; and
a memory having computer-executable instructions stored thereon, wherein the computer-executable instructions are configured for:
publishing an electronic master project schedule, prepared in accordance with a project software application, to a project server;
setting a target date within the electronic master project schedule;
passing the target date to a subproject owner;
publishing at least one independently managed electronic subproject schedule, prepared by the subproject owner, to the project server, wherein the at least one electronic subproject schedule includes the target date within the master project schedule, wherein the subproject represents phases of the master project schedule;
on the project server, establishing an electronic hierarchical relationship that links, at a summary task level, the electronic master project schedule, the at least one electronic subproject schedule and any other electronic subproject schedules that include the target date, wherein the at least one electronic subproject schedule is stored on the project server as a hierarchical child of the master project schedule;
on the project server, receiving an electronic submission from the subproject owner of the at least one electronic subproject schedule for a proposed change to the at least one electronic subproject schedule;
automatically determining by the project server whether the proposed change to the at least one electronic subproject schedule causes a change to the target date in the at least one electronic subproject schedule that is contingent upon the electronic master project schedule;
when the proposed change does not cause a change to the target date that is contingent upon the electronic master project schedule, permitting electronic persistence, on the project server, of the proposed change within the at least one electronic subproject schedule without causing the sending of a proposed electronic change notification from the project server to the owner of the electronic master project schedule; and
when the electronic proposed change causes a change to the target date that is contingent upon the electronic master project schedule,
holding electronic persistence, on the project server, of the electronic proposed change to the target date that is contingent upon the electronic master project schedule,
automatically sending an electronic proposed change notification from the project server to the master project owner, wherein the proposed change notification indicates the proposed change to the target date that is contingent upon the electronic master project schedule,
when an electronic rejection to the electronic proposed change is received on the project server, sending an electronic rejected change notification and an electronic proposed counter change notification from the project server to the subproject owner,
when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule, and
when an electronic acceptance to the electronic proposed change is received on the project server, automatically causing, on the project server, the electronic persistence of the electronic proposed change to the electronic master project schedule and the at least one electronic subproject schedule.

2. The system of claim 1, wherein the electronic rejected change notification is an electronic counter change notification that includes an electronic proposed counter change sent from the project server to the subproject owner.

3. The system of claim 2, wherein when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule.

4. The system of claim 2, wherein when an electronic rejection to the proposed electronic counter change is received on the project server sending an electronic rejected counter change notification from the project server to the master project owner.

5. The system of claim 1, wherein when an electronic rejection to the proposed electronic change is received on the project server from any owner of the any other electronic subproject schedules, sending an electronic rejected subsequent change notification from the project server to the master project owner.

6. A computer-readable storage medium having computer executable instructions for communicating scheduling changes in a project management schedule, the instructions comprising:

publishing an electronic master project schedule, prepared in accordance with a project software application, to a project server;

setting a target date within the electronic master project schedule;

passing the target date to a subproject owner;

publishing at least one independently managed electronic subproject schedule, prepared by the subproject owner, to the project server, wherein the at least one electronic subproject schedule includes the target date within the master project schedule, wherein the subproject represents phases of the master project schedule;

on the project server, establishing an electronic hierarchical relationship that links, at a summary task level, the electronic master project schedule, the at least one electronic subproject schedule and any other electronic subproject schedules that include the target date, wherein the at least one electronic subproject schedule is stored on the project server as a hierarchical child of the master project schedule;

on the project server, receiving an electronic submission from the subproject owner of the at least one electronic subproject schedule for a proposed change to the at least one electronic subproject schedule;

automatically determining by the project server whether the proposed change to the at least one electronic subproject schedule causes a change to the target date in the at least one electronic subproject schedule that is contingent upon the electronic master project schedule;

when the proposed change does not cause a change to the target date that is contingent upon the electronic master project schedule, permitting electronic persistence, on the project server, of the proposed change within the at least one electronic subproject schedule without causing the sending of a proposed electronic change notification from the project server to the owner of the electronic master project schedule; and when the electronic proposed change causes a change to the target date that is contingent upon the electronic master project schedule, holding electronic persistence, on the project server, of the electronic proposed change to the target date that is contingent upon the electronic master project schedule, automatically sending an electronic proposed change notification from the project server to the master project owner, wherein the proposed change notification indicates the proposed change to the target date that is contingent upon the electronic master project schedule, when an electronic rejection to the electronic proposed change is received on the project server, sending an electronic rejected change notification and an electronic proposed counter change notification from the project server to the subproject owner, when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule, and when an electronic acceptance to the electronic proposed change is received on the project server, automatically causing, on the project server, the electronic persistence of the electronic proposed change to the electronic master project schedule and the at least one electronic subproject schedule.

7. The computer-readable storage medium of claim 6, wherein the electronic rejected change notification is an electronic counter change notification that includes an electronic proposed counter change sent from the project server to the subproject owner.

8. The computer-readable storage medium of claim 7, wherein when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule.

9. The computer-readable storage medium of claim 7, wherein when an electronic rejection to the proposed electronic counter change is received on the project server sending an electronic rejected counter change notification from the project server to the master project owner.

10. The computer-readable storage medium of claim 6, wherein when an electronic rejection to the proposed electronic change is received on the project server from any owner of the any other electronic subproject schedules, sending an electronic rejected subsequent change notification from the project server to the master project owner.

11. A computer-implemented method for communicating scheduling changes in a project management schedule, the method comprising:

publishing an electronic master project schedule, prepared in accordance with a project software application, to a project server;

setting a target date within the electronic master project schedule;

passing the target date to a subproject owner;

publishing at least one independently managed electronic subproject schedule, prepared by the subproject owner, to the project server, wherein the at least one electronic subproject schedule includes the target date within the master project schedule, wherein the subproject represents phases of the master project schedule;

on the project server, establishing an electronic hierarchical relationship that links, at a summary task level, the electronic master project schedule, the at least one electronic subproject schedule and any other electronic subproject schedules that include the target date, wherein the at least one electronic subproject schedule is stored on the project server as a hierarchical child of the master project schedule;

on the project server, receiving an electronic submission from the subproject owner of the at least one electronic subproject schedule for a proposed change to the at least one electronic subproject schedule;

automatically determining by the project server whether the proposed change to the at least one electronic subproject schedule causes a change to the target date in the at least one electronic subproject schedule that is contingent upon the electronic master project schedule;

when the proposed change does not cause a change to the target date that is contingent upon the electronic master project schedule, permitting electronic persistence, on the project server, of the proposed change within the at least one electronic subproject schedule without causing the sending of a proposed electronic change notification from the project server to the owner of the electronic master project schedule; and when the electronic proposed change causes a change to the target date that is contingent upon the electronic master project schedule, holding electronic persistence, on the project server, of the electronic proposed change to the target date that is contingent upon the electronic master project schedule, automatically sending an electronic proposed change notification from the project server to the master project owner, wherein the proposed change notification indicates the proposed change to the target date that is contingent upon the electronic master project schedule, when an electronic rejection to the electronic proposed change is received on the project server, sending an electronic rejected change notification and an electronic proposed counter change notification from the project server to the subproject owner, when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule, and when an electronic acceptance to the electronic proposed change is received on the project server, automatically causing, on the project server, the electronic persistence of the electronic proposed change to the electronic master project schedule and the at least one electronic subproject schedule.

12. The computer-implemented method of claim 11, wherein the electronic rejected change notification is an electronic counter change notification that includes an electronic proposed counter change sent from the project server to the subproject owner.

13. The computer-implemented method of claim 12, wherein when an electronic acceptance to the proposed electronic counter change is received on the project server, automatically causing, on the project server, electronic persistence of the proposed electronic counter change on the electronic master project schedule and the at least one electronic subproject schedule and automatically sending an electronic subsequent counter change notification to any other owners of the any other electronic subproject schedules that are stored as a hierarchical child of the master project schedule.

14. The computer-implemented method of claim 12, wherein when an electronic rejection to the proposed electronic counter change is received on the project server sending an electronic rejected counter change notification from the project server to the master project owner.

15. The computer-implemented method of claim 11, wherein when an electronic rejection to the proposed electronic change is received on the project server from any owner of the any other electronic subproject schedules, sending an electronic rejected subsequent change notification from the project server to the master project owner.

* * * * *

UNITED STATES PATENT AND TRADEMARK OFFICE
CERTIFICATE OF CORRECTION

| | | |
|---|---|---|
| PATENT NO. | : 7,734,491 B2 | Page 1 of 1 |
| APPLICATION NO. | : 10/868661 | |
| DATED | : June 8, 2010 | |
| INVENTOR(S) | : Roy Kayahara et al. | |

It is certified that error appears in the above-identified patent and that said Letters Patent is hereby corrected as shown below:

In column 11, line 51, after "various" insert -- modifications or variations may be made in the present invention without departing from the scope or spirit of the invention. Other embodiments of the present invention will be apparent to those skilled in the art from consideration of the specification and practice of the invention as disclosed herein. --.

Signed and Sealed this

Fifteenth Day of February, 2011

David J. Kappos
*Director of the United States Patent and Trademark Office*